United States Patent Office 3,293,960
Patented Dec. 27, 1966

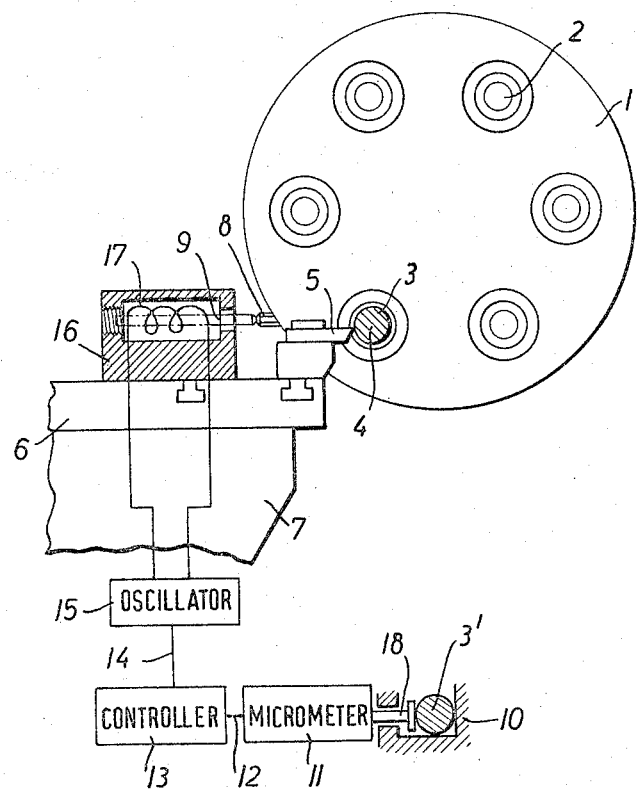

3,293,960
AUTOMATIC TURNING MACHINE WITH
AUTOMATIC DIMENSIONAL CONTROL
Philip Feldwisch, 34 Rektor-Schmitz-Strasse,
Cologne-Neuehrenfeld, Germany
Filed Oct. 21, 1964, Ser. No. 405,481
Claims priority, application Germany, Nov. 8, 1963,
Sch 34,131
4 Claims. (Cl. 82—2)

This invention relates to machine tools, and particularly to automatic turning machines and the like, which are equipped with automatic or semi-automatic controls for maintaining desired dimensions in the work pieces sequentially produced on the machine.

Dimensional variations in the output of machine tools are due mainly to play between movable elements of the machine, to tool wear, and to thermal expansion and contraction of machine elements.

It is known to provide machine tools with gaging devices which are connected with the tools by mechanical and electrical feedback circuits. The gaging devices measure a dimension of the machine output and automatically adjust the position of the corresponding tool if the gaged dimension varies from a desired value. The known devices are relatively complex, they are themselves subject to the sources of dimensional error pointed out in the preceding paragraph, and they are not readily adaptable for use with automatic turning machines.

The object of the invention is to provide a control arrangement of the type described which avoids the shortcomings of the known devices and is suitable for use on automatic turning machines and on other machine tools having similar structural features which are not readily compatible with the known devices.

With these and other objects in view, the invention in one of its aspects provides a machine tool with work holding means adapted to hold a work piece in a fixed position. A tool carrier is arranged on a common support with the work holding means for movement in a direction toward an operative position in which a tool mounted on the carrier is in cutting engagement with a work piece held in said fixed position. Abutment means on the work holding means and on the carrier are engageable with each other for limiting movement of the carrier toward its operative position. The abutment means on the carrier include a contact member which is movable relative to the carrier in the direction of movement of the latter, and actuating means for actuating movement of the contact member in response to the temperature of the actuating means.

A sensing station is provided for gaging the dimension of a work piece cut by the afore-mentioned tool, and a signal is generated in response to the gaged dimension. A heater provided for raising the temperature of the afore-mentioned actuating means is operated by the signal.

Other features and many of the attendant advantages of this invention will be readily apprecaited from the following detailed description of a preferred embodiment when considered in conjunction with the appended drawing the sole figure of which shows as much of an automatic turning machine as is necessary for an understanding of this invention, and a dimensional control arrangement of the invention, the view being partly elevational, partly in section, and partly diagrammatic.

Referring now to the drawing in detail, there is seen the spindle drum 1 of a multiple spindle automatic turning machine. Six circumferentially uniformly spaced work spindles 2 are mounted on the drum 1. For the sake of clarity, a metal rod 3 is shown only in one of the work spindles 2 which is positioned in the work station 4 in the illustrated position of the drum 1.

The rod 3 is engaged by a cutting tool 5 which is mounted on a cross slide 6 in adjustable fixed position. The slide 6 is movably mounted on the machine frame 7 which also supports the drum 1 in a conventional manner, not illustrated. The structure described so far is entirely conventional, and it will be understood that the turning machine also includes a drive which actuates the indexing rotary movement of the drum 1 and sequentially moves the several work spindles 2 into the station 4 where the rods held in the spindles are rotated in the drum about an axis whose angular position with respect to the drum axis remains fixed during the cutting operation.

The machine drive also moves the cross slide 6 toward and away from the work station 4 in synchronization with the indexing movement of the drum 1. The terminal position of the slide 6 near the work station 4 determines the depth of cut of the tool 5. This terminal position is reached when cooperating abutments on the drum 1 and on the slide 6 engage each other in a manner known in itself.

The abutment 8 on the drum 1 is a heavy pin which projects from the drum 1 in the direction of movement of the cross slide 6. The abutment assembly on the tool slide 6 consists of a heavy and rigid housing 16 fixedly mounted on the slide, and of a metal rod 9 which is coaxial with the pin 8. One end portion of the rod 9 threadedly engages a wall of the housing 16 remote from the drum 1. The central portion of the rod 9 freely extends through a cavity in the housing 16 and is enveloped by a heavy induction coil 17 which is insulated from the rod 9 in a manner not shown. The other end portion of the rod 9 slidably passes through an opening in the housing 16 and projects therefrom toward the pin 8.

A portion 10 of the machine frame 7 is recessed to provide firm backing for a previously machined cylindrical work piece 3′ while the diameter of the work piece is being gaged by a sensing plunger 18 of a signaling micrometer 11. The plunger 18 is urged toward the work piece 3′ by a spring, not visible in the drawing, which engages a portion of the plunger contained in the micrometer housing. The plunger 18 operates signaling circuits when the gaged diameter of the work piece 3′ is smaller than a predetermined minimum, or greater than a predetermined maximum. The circuits generate signals in a controller 13 which is connected with the micrometer 11 by a cable 12, and with a high frequency oscillator 15 by a cable 14. The controller 13 adjusts the output of the oscillator 15 in response to the signals received, and thereby varies the alternating current which flows through the coil 17 at a frequency to cause heating of the rod 9 by induction. The micrometer 11 and the oscillator 15 with its controller 13 are staple articles of commerce and do not require more detailed description.

The afore-described apparatus operates as follows:

The oscillator 15 normally holds the rod 9 at a temperature which is sufficiently higher than ambient temperature to minimize the influence of minor changes in the latter on the temperature, and therefore on the length, of the rod. When a production run is started, the rod 9, after being heated to its normal operating temperature, is set for abutting engagement with the pin 8 when the desired depth of cut is achieved. For so setting the rod, its projecting contact portion is turned, whereby the rod 9 threadedly moves on the housing 16. A non-illustrated set screw permits the adjusted position of the rod 9 to be secured.

As the tool 5 wears, the work pieces cut thereby increase in diameter when the relative position of the abutment members 8, 9 remains constant. The machined pieces are therefore gaged from time to time between the frame portion 10 and the plunger 18. When the plunger is driven farther into the micrometer housing by the gaged work piece than is permissible, the controller 13 is actuated to reduce the output of the oscillator 15, whereby the current flowing in the coil 17 is reduced, the temperature of the rod 9 drops, and its length is reduced. The tool 5 can travel farther toward the rod 3 before the pin 8 and the rod 9 engage each other. The diameter of the finished work piece is decreased.

When for any reason the diameter of a gaged work piece 3' is too small, the temperature of the rod 9 is increased, and its contact portion is projected farther from the housing 16, thereby shortening the stroke of the cross slide 16. The portion of the rod 9 enveloped by the coil 17 thus actuates the movement of the contact portion of the rod as the rod temperature varies.

Obviously, many modifications and variations of the present invention are possible in the light of the above teachings. It is therefore to be understood that, within the scope of the appended claims, the invention may be practiced otherwise than as specifically described.

What is claimed is:

1. In a machine tool, in combination:
   (a) a support;
   (b) work holding means for holding a work piece in a predetermined position on said support;
   (c) first abutment means on said work holding means;
   (d) a cutting tool;
   (e) a tool carrier mounted on said support and movable thereon in a direction toward an operative position, said tool being mounted on said carrier for cutting engagement wtih a work piece held in said predetermined position when said carrier moves toward said operative position thereof;
   (f) second abutment means on said carrier and engageable with said first abutment means for limiting movement of said carrier in said direction, said second abutment means including
      (1) a contact member movable relative to said carrier in said direction, and
      (2) actuating means for actuating movement of said contact member relative to said carrier in said direction in response to the temperature of said actuating means;
   (g) sensing means for sensing the dimension of a work piece;
   (h) signal generating means for generating a signal in response to the dimension sensed by said sensing means; and
   (i) heating means responsive to said signal for raising the temperature of said actuating means.

2. In an automatic turning machine, in combination:
   (a) a support;
   (b) a spindle drum mounted on said support for indexing rotary movement about an axis;
   (c) a plurality of work holders mounted on said support and circumferentially spaced about said axis for sequential movement of the work holders through a work station during said movement of said drum;
   (d) a tool slide movable on said support toward and away from said work station, said tool slide and said drum constituting a pair of machine elements;
   (e) cooperating first and second abutment means respectively mounted on said elements for limiting movement of said tool slide toward said work station, one of said abutment means including
      (1) an abutment member elongated in the direction of tool slide movement, one longitudinal end portion of said abutment member being fixedly fastened to the associated machine element, and the other longitudinal end portion of said abutment member freely extending from said fastened portion toward the other abutment means, said abutment member consisting of metallic material and varying in length with the temperature thereof, and
      (2) heating means operable for heating said abutment member;
   (f) sensing means for sensing a dimension of a work piece; and
   (g) control means operatively connected to said sensing means and to said heating means for operating the latter in response to a dimension sensed by said sensing means.

3. In a machine as set forth in claim 2, said heating means including a conductive coil enveloping a portion of said abutment member, and a high frequency oscillator having output terminals connected to said coil for passing alternating current through the same, and being connected in circuit with said control means.

4. In a machine as set forth in claim 2, engaged threads on said one end portion of said abutment member and on said associated machine element, said threads having an axis extending in said direction.

References Cited by the Examiner
UNITED STATES PATENTS
3,010,348  11/1961  Swanson et al. _____ 82—2.5

WILLIAM W. DYER, JR., *Primary Examiner.*

L. VLACHOS, *Assistant Examiner.*